US012664370B2

(12) United States Patent
Higo

(10) Patent No.: US 12,664,370 B2
(45) Date of Patent: Jun. 23, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tomoaki Higo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 603 days.

(21) Appl. No.: 18/074,160

(22) Filed: Dec. 2, 2022

(65) Prior Publication Data

US 2023/0186028 A1 Jun. 15, 2023

(30) Foreign Application Priority Data

Dec. 14, 2021 (JP) ................................. 2021-202343

(51) Int. Cl.
*G06F 40/295* (2020.01)
*G06F 40/166* (2020.01)
(Continued)

(52) U.S. Cl.
CPC .......... *G06F 40/295* (2020.01); *G06F 40/166* (2020.01); *G06V 10/25* (2022.01); *G06V 30/148* (2022.01); *G06V 30/414* (2022.01)

(58) Field of Classification Search
CPC ..... G06F 40/295; G06F 40/166; G06V 10/25; G06V 30/148; G06V 30/414; G06V 30/416; G06V 30/10; G06N 20/00
See application file for complete search history.

(56) References Cited

U.S. PATENT DOCUMENTS 6,272,242 B1 * 8/2001 Saitoh .............. G06V 30/19007
382/187
6,643,401 B1 * 11/2003 Kashioka ........... G06V 30/2445
382/229
(Continued)

FOREIGN PATENT DOCUMENTS

GB 2428114 A * 1/2007 ............. G06V 30/40
JP 2007241355 A * 9/2007 ......... G06V 30/1448
(Continued)

OTHER PUBLICATIONS

Office Action dated Aug. 19, 2025 in counterpart Japanese Application No. 2021-202343, together with English translation thereof.
(Continued)

*Primary Examiner* — Linda Wong
(74) *Attorney, Agent, or Firm* — Venable LLP

(57) ABSTRACT
The present disclosure relates to a technique of generating a disclosable document image based on a document image including confidential information, without using the confidential information. A document input unit obtains a document image scanned with a scanner, separates the document image into character information and background information, and then outputs them to an extraction unit. The extraction unit performs named entity extraction processing on the obtained character information and background information to extract named entities in the document and attributes thereof, and output an extraction result to a generation unit. The generation unit replaces the named entities in the document image with attribute tags and obtains superimposable ranges to generate attribute tag document data. A management unit registers the received extraction result of the named entities and the attribute tag document data in a database.

10 Claims, 13 Drawing Sheets

(51) Int. Cl.
   *G06V 10/25*          (2022.01)
   *G06V 30/148*         (2022.01)
   *G06V 30/414*         (2022.01)

(56)           References Cited

U.S. PATENT DOCUMENTS

| | | | | |
|---|---|---|---|---|
| 2002/0012468 A1* | 1/2002 | Togashi | ................. | G06V 10/10 |
| | | | | 382/229 |
| 2002/0120653 A1* | 8/2002 | Kraft | ......................... | G06T 3/40 |
| | | | | 707/E17.121 |
| 2010/0332484 A1 | 12/2010 | Saito | ............................. | 707/757 |
| 2019/0132481 A1 | 5/2019 | Yasui et al. | ............ | H04N 1/444 |
| 2020/0019768 A1 | 1/2020 | Chen et al. | ........ | G06K 9/00442 |
| 2020/0320289 A1 | 10/2020 | Su | ...................... | G06K 9/00456 |
| 2021/0249139 A1* | 8/2021 | Thakore | ............... | G06V 30/424 |
| 2022/0078309 A1* | 3/2022 | Kishimoto | ........... | H04N 1/4493 |

FOREIGN PATENT DOCUMENTS

| | | |
|---|---|---|
| JP | 2011-008394 | 1/2011 |
| JP | 2011-133991 | 7/2011 |
| JP | 2019057115 A | 4/2019 |
| JP | 2019-082887 | 5/2019 |
| JP | 2020-009365 | 1/2020 |
| JP | 2020-173808 | 10/2020 |
| JP | 2021-163168 | 10/2021 |
| WO | 2020/044537 | 3/2020 |
| WO | 2021/009994 | 1/2021 |

OTHER PUBLICATIONS

Japanese Office Action dated Mar. 24, 2026 in counterpart Japanese Patent Appln. No. 2021-202343 .

* cited by examiner

ORDER SHEET

Bill to                          2021/5/17
ABC Corporation

WE WILL MAKE ORDER AS FOLLOWS.

· · · · ·

· · · · · · ·

· · · ·TOTAL      $100.00

XYZ Inc.
OO OO

FIG.1

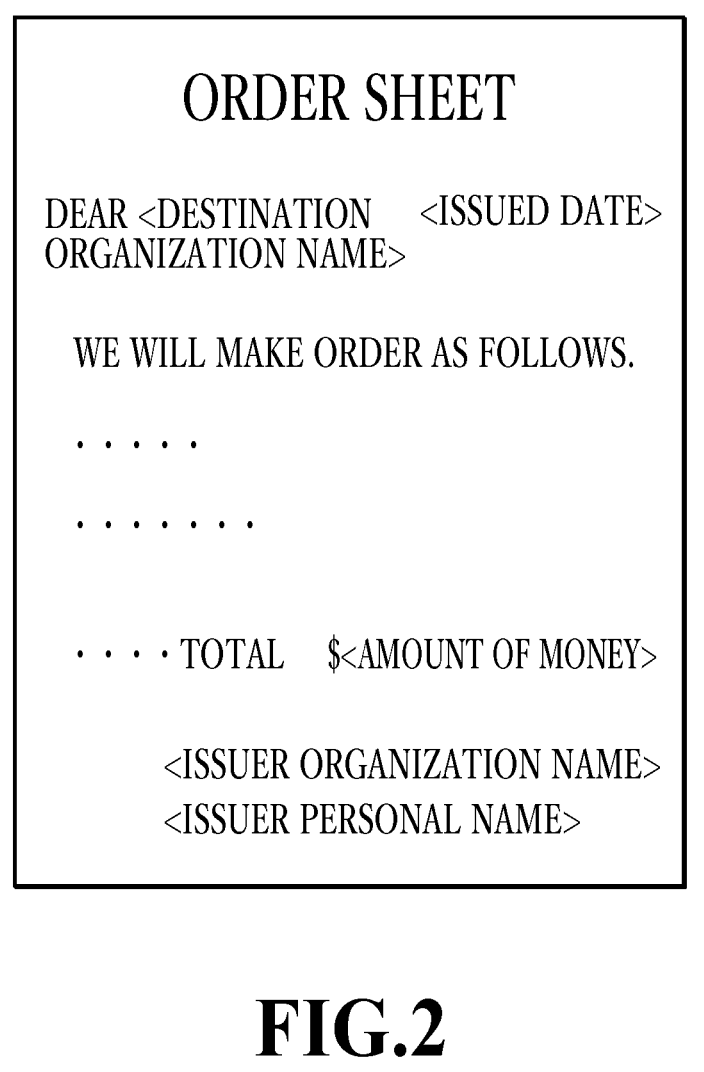

ORDER SHEET

DEAR <DESTINATION     <ISSUED DATE>
ORGANIZATION NAME>

WE WILL MAKE ORDER AS FOLLOWS.

. . . . .

. . . . . . .

. . . . TOTAL    $<AMOUNT OF MONEY>

<ISSUER ORGANIZATION NAME>
     <ISSUER PERSONAL NAME>

FIG.2

| BLOCK ID | START POSITION, END POSITION | NAMED ENTITY | ATTRIBUTE |
|---|---|---|---|
| 2 | 0, 6 | ABC Corporation | DESTINATION ORGANIZATION NAME |
| 3 | 0, 8 | 2021/5/17 | ISSUED DATE |
| 8 | 3, 7 | 100.00 | AMOUNT OF MONEY |
| 9 | 0, 7 | XYZ Inc. | ISSUER ORGANIZATION NAME |
| 10 | 0, 5 | ○○ ○○ | ISSUER PERSONAL NAME |

FIG.5

START

─S601

OBTAIN DOCUMENT IMAGE

─S602

EXTRACT NAMED ENTITIES AND ATTRIBUTES

─S603

GENERATE ATTRIBUTE TAG DOCUMENT DATA

─S604

CHECK AND EDIT GENERATION RESULT

─S605

REGISTER ATTRIBUTE TAG DOCUMENT DATA
AND NAMED ENTITIES IN DATABASE

─S606

TRANSMISSION
CONDITION IS SATISFIED?          NO

YES          ─S607

TRANSMIT ATTRIBUTE TAG DOCUMENT DATA

END

INFORMATION PROCESSING APPARATUS, INFORMATION PROCESSING METHOD, AND STORAGE MEDIUM

BACKGROUND OF THE INVENTION

Field of the Invention

The present disclosure relates to an information processing technique for data utilization of confidential documents as disclosable documents.

Description of the Related Art

In a technique relating to natural language processing using documents as inputs, usage of machine learning on a large-scale dataset has enabled obtaining of high-quality output results in various tasks such as passage comprehension, document summarization, and question answering. However, in conventional natural language processing, comprehension of business form documents such as a bill or a receipt is more difficult than comprehension of documents mainly formed of sentences sectioned by punctuation marks in many cases due to reasons such as lack of sentence formats such as subject and predicate and less-frequent usage of conjunctions and particles. Moreover, since the business form documents are confidential documents in many cases, the business form documents cannot be disclosed in many cases from a viewpoint of security and it is difficult to prepare and collect a large amount of data for machine learning. As described above, the business form documents are difficult to handle as targets of natural language processing.

As a technique of converting a confidential document image to a disclosable document image, Japanese Patent Laid-Open No. 2011-8394 discloses a method in which secrete words are each replaced by another candidate word having the same attribute as the attribute of the secrete word.

However, the method of Japanese Patent Laid-Open No. 2011-8394 has the following problem. Since the secrete words to be replaced need to be registered in advance and set to a referenceable state with security being ensured, the registration and management of the secrete words are burdensome.

An object of the present disclosure is to generate a disclosable document image based on a document image including confidential information, without using the confidential information.

SUMMARY OF THE INVENTION

An aspect of the present disclosure is an information processing apparatus including: an obtaining unit configured to obtain character blocks in a first document image obtained by scanning a document and character strings obtained by performing character recognition processing on the respective character blocks; an extraction unit configured to extract the character string corresponding to a named entity of a predetermined attribute from the obtained character strings; and a first generation unit configured to generate document data including at least attribute information relating to the attribute of the named entity corresponding to the extracted character string and position information of the character block corresponding to the extracted character string.

Further features of the present invention will become apparent from the following description of exemplary embodiments with reference to the attached drawings.

BRIEF DESCRIPTION OF THE DRAWINGS

FIG. 1 is a diagram illustrating an example of a business form document image;

FIG. 2 is a diagram illustrating an example of attribute tag document data;

FIG. 5 is a table illustrating an example of an extraction result of named entities;

DESCRIPTION OF THE EMBODIMENTS

Definition of terms is described prior to description of embodiments according to the present disclosure.

A named entity is a character string to which an attribute is assigned as a correct answer data and is a character string typically expressing a personal name, an organization name, a date, an amount of money, or the like among character strings in a document in many cases. In a document that cannot be disclosed from the viewpoint of security, the named entity is confidential information in many cases.

The attribute is information that is assigned to the character string being the named entity and that expresses the category of the named entity.

An attribute tag is information having an expression form to be embedded in the document as a tag expressing the attribute. For example, the attribute tag expressing a personal name to which the document is directed is <destination personal name>, the attribute tag expressing an organization name to which the document is directed is <destination organization name>, and other examples of the attribute tag include <issuer personal name>, <issuer organization name>, <issued date>, <amount of money>, and the like. In the document, the attribute tag is described by being enclosed in < >.

Figure 1:
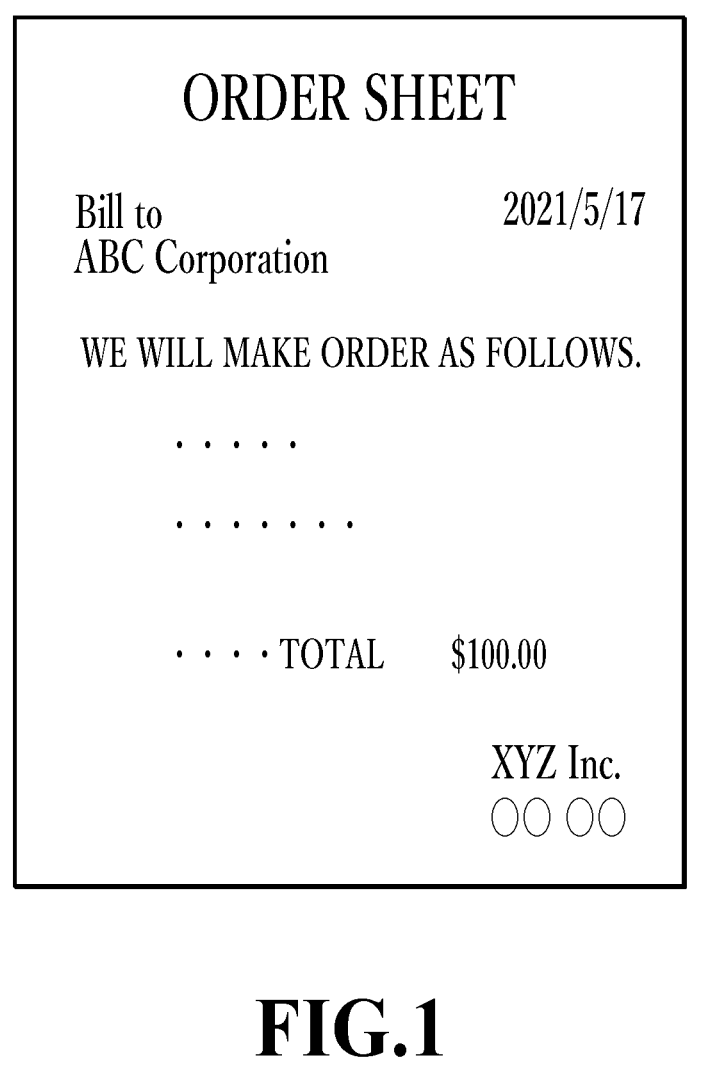

Attribute tag document data is formed of: a document image in which character blocks corresponding to the character strings of the named entities in an inputted document image are replaced by the attribute tags; and position information and attribute information of the named entities. For example, the attribute tag document data corresponding to a business form document illustrated in FIG. 1 is data as illustrated in FIG. 2. The named entity "ABC Inc." is replaced by <destination organization name>, "$100.00" is replaced by $<amount of money>, and the other named entities are also replaced by the corresponding attribute tags.

An information processing apparatus of the embodiments according to the present disclosure is described below in detail.

Figure 3:
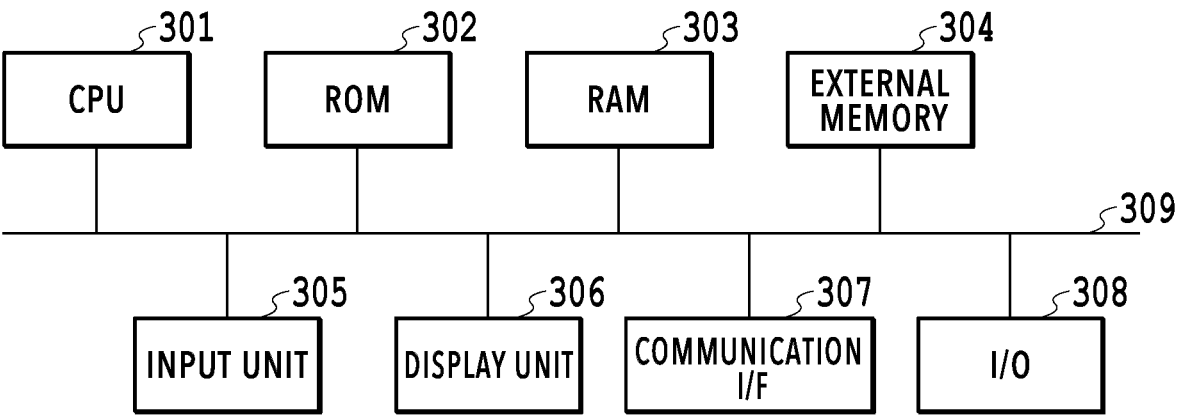
FIG. 3 is a diagram illustrating a hardware configuration of an information processing apparatus.

First, a hardware configuration by which the information processing apparatus described in each embodiment is implemented is explained by using FIG. 3.

Figure 4:
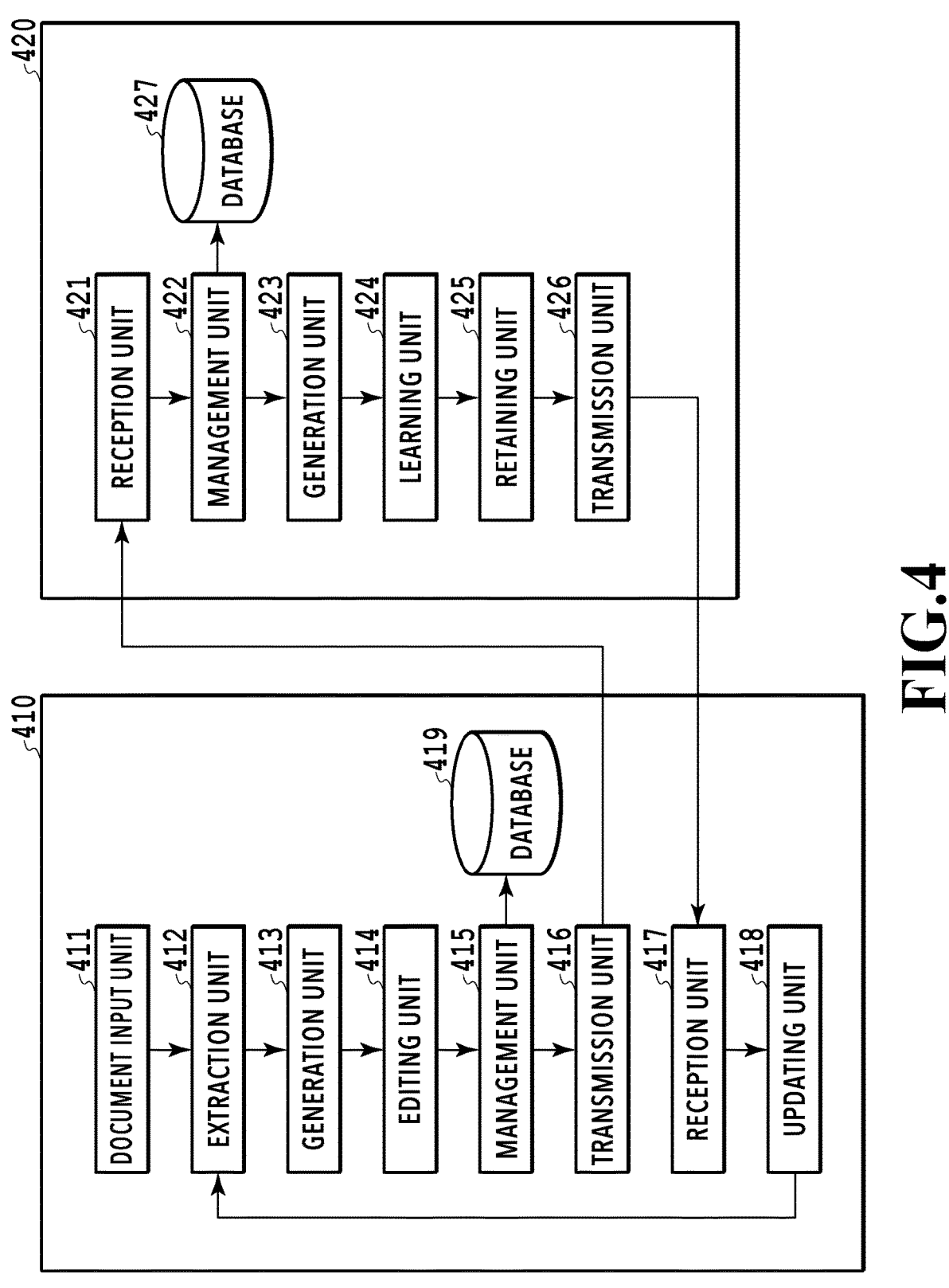
FIG. 4 is a diagram illustrating a functional configuration example of an information processing system in a first embodiment.

FIG. 3 is a diagram illustrating a hardware configuration of a first information processing apparatus 410 illustrated FIG. 4. A CPU 301 performs control of various devices connected to a system bus 309. A ROM 302 stores a program of basic input/output system (BIOS) and a boot program. A RAM 303 is used as a main storage device of the CPU 301. An external memory 304 stores a program to be processed by the first information processing apparatus 410. An input unit 305 is a touch panel, a keyboard, a mouse, or a robot controller and performs processing relating to input of information and the like. A display unit 306 outputs a calculation result of the information processing apparatus to a display device according to an instruction from the CPU 301. Note that the display device may be any type of display device such as a liquid crystal display device, a projector, or an LED indicator. A communication interface 307 is an interface that performs information communication via a network and may be any type of communication interface such as Ethernet (registered trademark), USB, serial communication, or wireless communication. An input/output (I/O) unit 308 is a unit that achieves connection with an external apparatus such as a scanner.

A hardware configuration of a second information processing apparatus 420 is substantially the same as the hardware configuration of the first information processing apparatus 410 illustrated in FIG. 3 except for the input/output (I/O) unit 308 that achieves connection with the scanner, and description thereof is thus omitted.

First Embodiment

An information processing system according to a first embodiment can convert a document image, obtained by scanning a document including confidential information such as a business form, into data that is easy to use as learning data for natural language processing and in which risk of leakage of confidential information is suppressed. Moreover, the information processing system can automatically generate different learning data by replacing the character strings corresponding to the confidential information with randomly-selected different character strings.

FIG. 4 is a diagram illustrating a functional configuration example of the information processing system according to the present embodiment. In FIG. 4, the first information processing apparatus 410 is a client terminal and the second information processing apparatus 420 is a server terminal. The first information processing apparatus 410 is connected to a scanner that is capable of scanning a document, and includes a document input unit 411, an extraction unit 412, a generation unit 413, an editing unit 414, a management unit 415, a transmission unit 416, a reception unit 417, an updating unit 418, and a database 419. The second information processing apparatus 420 includes a reception unit 421, a management unit 422, a generation unit 423, a learning unit 424, a retaining unit 425, a transmission unit 426, and a database 427. Note that FIG. 4 is an example of the functional configuration and does not limit the scope of application of the present disclosure.

In the case where a document image obtained by scanning a document is inputted, the document input unit 411 performs character recognition processing on character blocks of the document image to obtain character information and background information. Specifically, the document input unit 411 extracts the character blocks expressing character regions from the document image, and performs OCR on each character block to obtain the character information. The character information includes coordinates indicating the position and size of each character block obtained in the extraction of the character block and character codes and font information obtained by the OCR performed on the block. The background information is information on objects other than the characters included in the document and includes, for example, images of objects other than characters such as rule lines, diagrams, and pictures and layout information of these objects. Note that, since a background portion of a region in which characters are present is hidden by the characters, a technique of in-painting may be used to fill this background portion. For example, pixels for which colors are absent due to removable of characters may be filled with colors of pixels nearest to these pixels. The obtained character information and background information are outputted to the extraction unit 412.

The extraction unit 412 extracts the character strings of the named entities that are present in the document and to which predetermined attributes are assigned, by using a named entity extraction method on the inputted character information and background information. The extraction unit 412 obtains the attributes from a predetermined attribute list. Typical attributes include, for example, <destination personal name>, <issuer personal name>, <destination organization name>, <issued date>, <amount of money>, and the like. The character information is assumed to be input of the named entity extraction method in which the corresponding character blocks are arranged in appropriate arrangement order (for example, left to right and top to bottom in case of horizontal writing). A language model for natural language processing such as, for example, BERT or GPT-3 may be used for the named entity extraction method. Moreover, the position information and the background information of the character blocks and the character strings may be supplementally used in estimation of the named entities and the attributes. For example, it is possible to employ a method of incorporating, in the estimation, statistical tendencies such as the named entity of <destination personal name> tends to appear in an upper left portion of the document and the named entity of <issued date> tends to appear in an upper right portion of the document.

FIG. 5 illustrates an example of a result of extraction of the named entities by the extraction unit 412. The extraction result of the named entities includes four items of a block ID, a set of a start position and an end position, a named entity, and an attribute. The block ID is information for identifying each of the character blocks in the document and is associated with information on the position and size of the character block. The start position and the end position indicate what numbers the first and last characters of the characters corresponding to the named entity are in the character string in each character block. The named entity is a character string corresponding to the named entity in each character block. The attribute is an attribute corresponding to each named entity. The extraction unit 412 outputs the extraction result of the named entities for these items to the generation unit 413.

The generation unit 413 replaces the character blocks corresponding to the character strings of the predetermined named entities on the scanned image of the inputted document data with the attribute tags to generate the attribute tag document data. First, the generation unit 413 obtains the information on the position and size of each of the character blocks in which the character strings of the predetermined named entities are present, from the character information obtained in the document input unit 411. Moreover, the generation unit 413 obtains a superimposable range in which an image indicating the attribute tag can be superimposed, from the layout information of objects other than characters such as rule lines that is included in the background information obtained in the document input unit 411. The superimposable range is a region in which an image indicating a character string expressing the attribute tag is allowed to be superimposed on the document image. The superimposable range is a range in which a region in which the character block extracted as the named entity is arranged can be expanded toward the right side and the lower side without overlapping other character blocks, without crossing the ruled lines, or without entering regions of diagrams, pictures, and the like. This processing is processing deriving from the fact that many business form documents are horizontal writing and sentences are written from left to right and from top to bottom in many languages including Japanese. However, for a block determined to be written while being right aligned, the region is expanded toward the left side instead of the right side. Moreover, for a character block written while being centered, the region is expanded toward the left and right sides. In the case where the superimposable range is obtained, the generation unit 413 superimposes the image indicating the attribute tag on each superimposable range to generate the attribute tag document data. The generated attribute tag document data is outputted to the editing unit 414.

The editing unit 414 receives operations such as correction of the named entities and the attributes made on the attribute tag document data based on input from a user. FIG. 5 illustrates an example of the extraction result of the named entities. The user checks the extraction result of the named entities as illustrated in FIG. 5, an original business form document image, a document image of the attribute tag document data, and the like displayed on a not-illustrated display unit. Then, the editing unit 414 receives user input instructing editing such as addition and deletion of a named entity, correction of a character string range, and change of an attribute, and updates the extraction result of the named entities and the attribute tag document data. For a character block for which the attribute tag is newly added, the superimposable range is obtained in a method similar to that described for the generation unit 413. The update result is outputted to the management unit 415.

The management unit 415 receives the extraction result of the named entities and the attribute tag document data as input and registers and retains these in the database 419. The management unit 415 manages the extraction result of the named entities in the form illustrated in FIG. 5 in which each piece of named entity information is associated with the block ID, the start position, the end position, and the attribute such that the original business form document image can be reconfigured. Note that the items to be managed in the extraction result of the named entities are not limited to these items. For example, the configuration may be such that an attribute ID for identifying the attribute is further appended and the above items are managed together with the attribute ID.

The database 419 saves the extraction result of the named entities and the attribute tag document data. Note that, since the named entities are the confidential information, the named entities may be retained in a high-security database separate from the database 419. For example, the named entities may be saved in a not-illustrated database outside the first information processing apparatus 410.

The transmission unit 416 transmits the attribute tag document data in the database 419 to the reception unit 421 of the second information processing apparatus 420 via the management unit 415.

The reception unit 421 receives the attribute tag document data from the first information processing apparatus 410. The received attribute tag document data is outputted to the management unit 422.

Among the pieces of received attribute tag document data, the management unit 422 registers, in the database 427, only such attribute tag document data that no attribute tag document data being substantially the same and equivalent to this attribute tag document data is registered in the database 427. Moreover, the management unit 422 manages the learned language model used to perform the natural language processing to be described later and parameters of thresholds and weights of the learned language model and, in the case where determining that these model and parameters are to be transmitted, causes the transmission unit 426 to transmit these model and parameters. Furthermore, in the case where the management unit 422 determines that the learned model and the parameters thereof retained in the retaining unit 425 are unnecessary, the management unit 422 deletes these model and parameters. For example, the management unit 422 determines that, among the learned language models and the parameter groups thereof retained in the retaining unit 425, the language model and the parameter group with a relatively lower evaluation value set by the learning unit 424 to be described later are unnecessary.

The database 427 saves the attribute tag document data.

The generation unit 423 obtains the attribute tag document data from the database 427 via the management unit 422 and replaces the region of each attribute tag with the character string of the named entity of the same attribute to generate a new business form document image. The replacing named entity is randomly taken out from character strings registered in a list of named entities of the attribute designated by the attribute tag such as, for example, an organization name list or a personal name list. Note that the method of obtaining the replacing named entity is not limited to this method of selecting the named entity from the named entity list. For example, for the date, a date character string may be generated by setting arbitrary values for Y, M, and D based on a pattern of describing dates such as YYYY-MM-DD or YYYY/MM/DD. The character string after the replacement is subjected to line feed or font size change to fit into the superimposable range set in the attribute tag document data. The new business form document image is generated by replacing all attribute tags with the character strings as described above. Moreover, since the replacing character strings are randomly selected and generated, multiple different business form document images can be easily generated by repeating these processes on one piece of attribute tag document data. The generated business form document image group is outputted to the learning unit 424.

The learning unit 424 performs machine learning of a language model used to perform a named entity extraction task while using the business form document image group as input data. This language model uses the same model configuration as that of the extraction unit 412. After the learning, the learning unit 424 evaluates named entity extraction accuracy by using supervised data that is input data including correct answer data for the learned model and, in the case where the evaluation value is higher than a threshold, outputs the learned model and the parameters to the retaining unit 425. For example, the threshold may be set to an evaluation value obtained for the learning model currently used in the extraction unit 412. Note that the language model for which the learning unit 424 performs the machine learning is not limited to the model that performs the named entity extraction task. The learning unit 424 may perform learning for a model that performs a task of estimating document types (type such as bill or receipt) of the business form documents or a model that performs a task of question answering in the business form documents, by using the business form document image group. The learning unit 424 can learn various language models that perform natural language processing on business form documents that are difficult to learn due to a small amount of disclosed data, by using the business form document image group generated by the generation unit 423.

The retaining unit 425 saves the learned language model and the parameters thereof outputted from the learning unit 424. However, in the case where the configurations of the language models are the same in the extraction unit 412 and the learning unit 424 and only one model configuration is to be used, only the parameters may be saved.

The transmission unit 426 transmits the learned language model and the parameters thereof retained in the retaining unit 425, to the reception unit 417 of the first information processing apparatus 410.

The reception unit 417 receives the language model and the parameters transmitted by the transmission unit 426 of the second information processing apparatus 420 and outputs them to the updating unit 418.

The updating unit 418 replaces the language model of the extraction unit 412 with the outputted language model and the parameters thereof. In the case where the language model of the extraction unit 412 and the learning model of the learning unit 424 have the same configuration, the updating unit 418 may update only the parameters. Updating the parameters enables named entity extraction with higher estimation accuracy. Accordingly, labor required to check and correct the named entities and the attributes by the user can be reduced.

Figure 6:
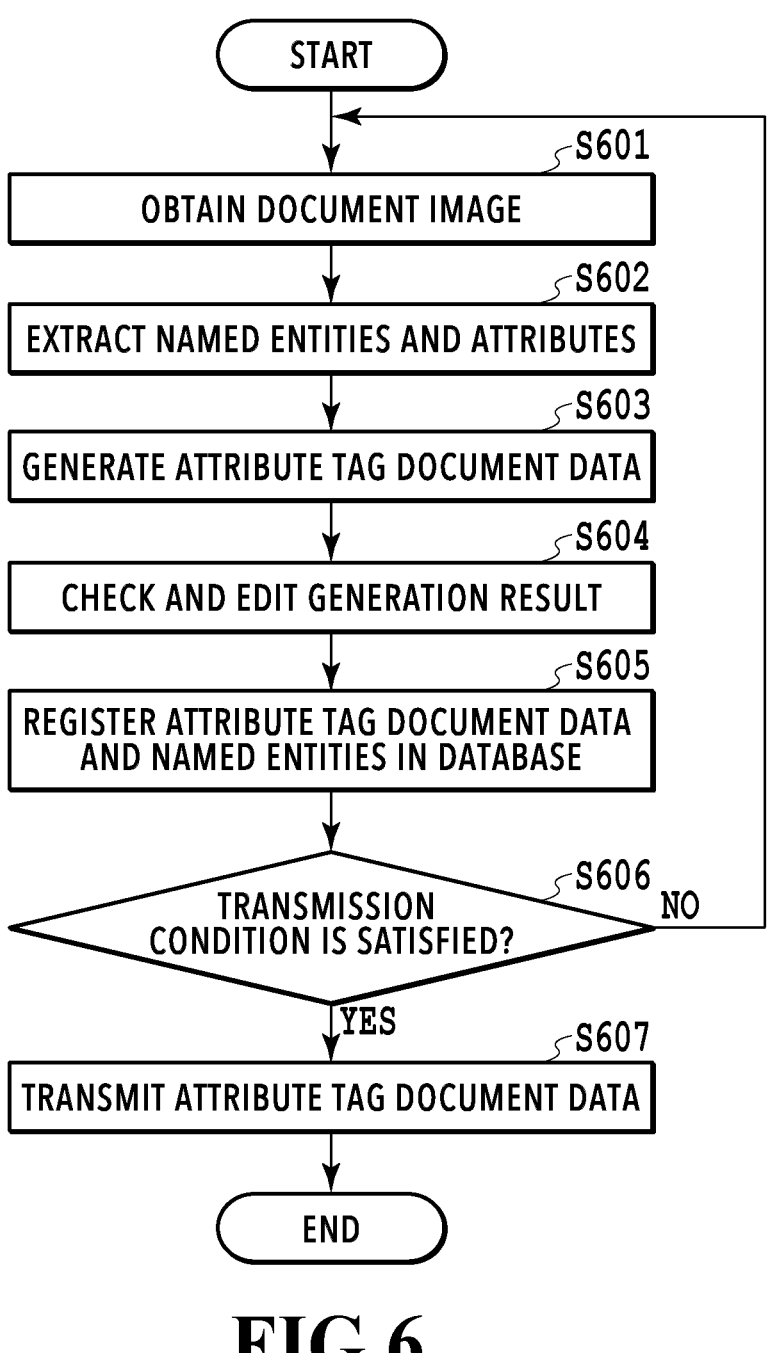
FIG. 6 is a flowchart illustrating a processing procedure executed by a first information processing apparatus in the first embodiment.
Figure 7:
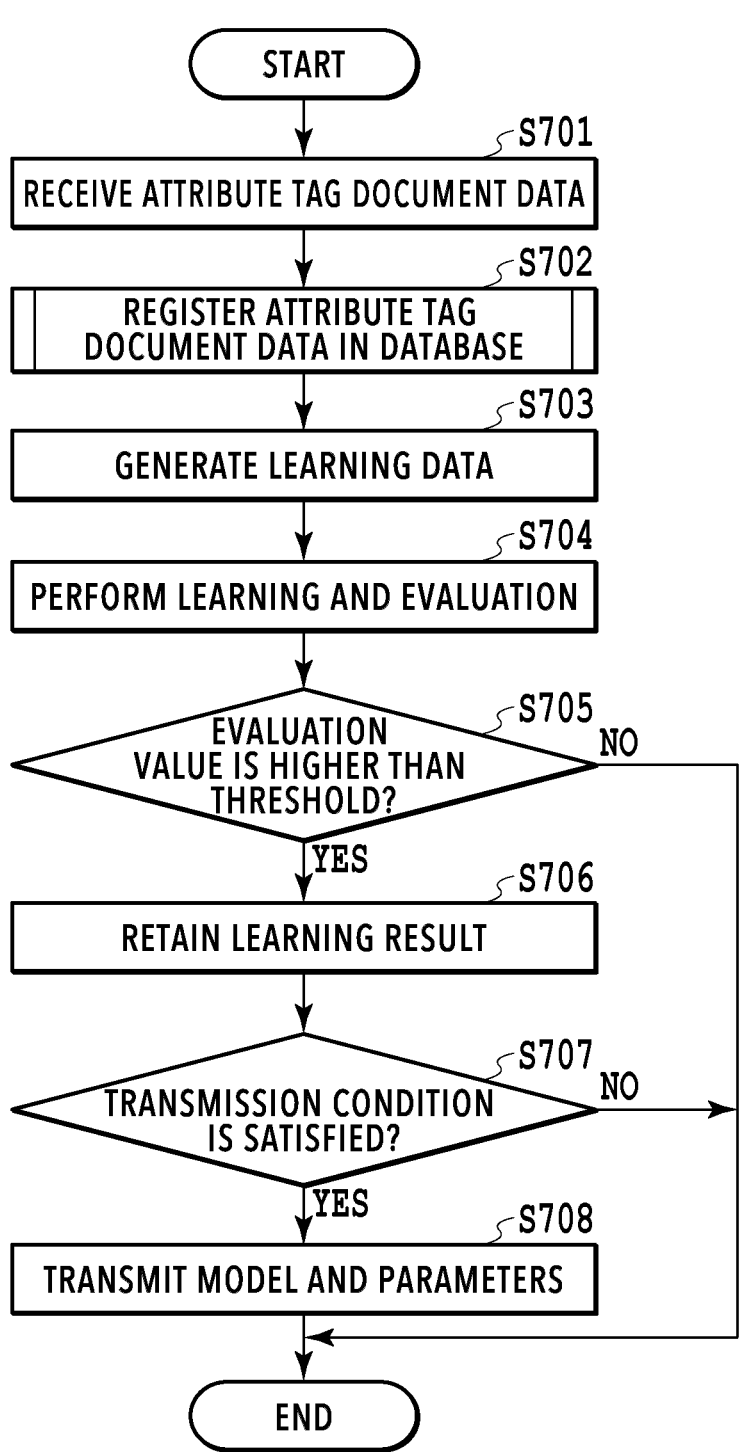
FIG. 7 is a flowchart illustrating a processing procedure executed by a second information processing apparatus in the first embodiment.
Figure 8:
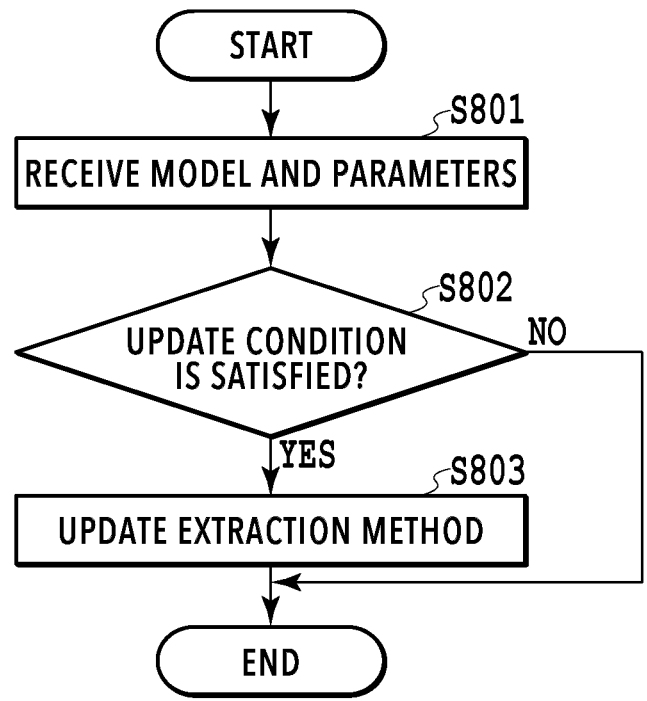
FIG. 8 is a flowchart illustrating a processing procedure executed by the first information processing apparatus in the first embodiment.

Next, processing procedures in the present embodiment are described. In the following description, each step is described by attaching S at the front of the corresponding reference sign. FIG. 6 is a flowchart illustrating a processing procedure executed from a point where the first information processing apparatus 410 obtains the document image to a point where the first information processing apparatus 410 transmits data to the second information processing apparatus 420. FIG. 7 is a flowchart illustrating a processing procedure executed from a point where the second information processing apparatus 420 receives the data outputted by the first information processing apparatus 410 to a point where the second information processing apparatus 420 transmits the learning model and the parameters to the first information processing apparatus 410. FIG. 8 is a flowchart illustrating a processing procedure executed from a point where the first information processing apparatus 410 receives the learned model and the parameters from the second information processing apparatus 420 to a point where the first information processing apparatus 410 performs the update. Note that the first information processing apparatus 410 and the second information processing apparatus 420 do not have to necessarily perform all steps described in these flowcharts. Hereinafter, the flowcharts are assumed to be implemented by executing a program stored in the external memory 304 with the CPU 301 of the information processing apparatus illustrated in FIG. 3.

Moreover, the first information processing apparatus 410 and the second information processing apparatus 420 first perform initialization of not-illustrated systems. Specifically, the information processing apparatuses are set to an operable state by reading the program from the external memory 304.

First, description is given of the processing procedure executed from the point where the first information processing apparatus 410 obtains the document image to the point where the first information processing apparatus 410 transmits the data to the second information processing apparatus 420, by using FIG. 6.

In S601, the document input unit 411 obtains the document image scanned with the not-illustrated scanner, separates the document into the character information and the background information, and then outputs the character information and the background information to the extraction unit 412. Note that the document image obtained herein may be obtained from a storage apparatus or another external apparatus via a network, instead of being obtained from the scanner.

In S602, the extraction unit 412 performs the named entity extraction processing on the obtained character information and the background information to extract the named entities in the document and the attributes thereof, and outputs the extraction result to the generation unit 413.

In S603, the generation unit 413 replaces the named entities in the document image with the attribute tags and obtains the superimposable ranges to generate the attribute tag document data. The generation unit 413 outputs the generated attribute tag document data to the editing unit 414.

In S604, the editing unit 414 receives check and correction of the named entities and the attributes based on input from the user. The user can select an attribute tag from the attribute tag list generated based on the extraction result extracted by the extraction unit 412, and set the attribute tag. The editing unit 414 updates the attribute tag document data based on input of the user and outputs the updated attribute tag document data to the management unit 415.

In S605, the management unit 415 registers the inputted extraction result of the named entities and the attribute tag document data in the database 419.

In S606, the management unit 415 monitors the database 419 and, in the case where a predetermined transmission condition is satisfied, the processing proceeds to S607. In the case where the predetermined transmission condition is not satisfied, the processing returns to S601, and the document input unit 411 receives input of the document image. The predetermined transmission condition in this case is whether the number of pieces of newly-registered attribute tag document data has exceeded a certain number. Note that the predetermined transmission condition is not limited to this. For example, the predetermined transmission condition may be such that a certain period has elapsed from the previous transmission and the newly-registered attribute tag document data is present.

In S607, the transmission unit 416 transmits the attribute tag document data in the database 419 to the reception unit 421 of the second information processing apparatus 420 via the management unit 415. In the case where the transmission is completed, the management unit 415 deletes the attribute tag document data transmitted from the database 419. Note that the timing of deletion is not limited to this. For example, among pieces of attribute tag document data for which transmission is completed, the attribute tag document data for which a predetermined period has elapsed from the registration in the database 419 may be deleted.

Although the steps are described to be executed one by one in the present processing procedure, the execution of steps is not limited to this. For example, the steps may be executed in parallel such that the document input unit 411 inputs the next document image in S601 while the management unit 415 registers the attribute tag document data in the database 419 in S605.

Next, the processing procedure executed by the second information processing apparatus 420 is described by using FIG. 7.

In S701, the reception unit 421 receives the attribute tag document data from the first information processing apparatus 410 and outputs the received attribute tag document data to the management unit 422.

In S702, the management unit 422 registers the inputted attribute tag document data into the database 427. Details of the registration method are described later by using FIG. 9.

In S703, the generation unit 423 obtains an attribute tag document data group via the management unit 422, and generates business form document images necessary for learning of the language model. The generated business form document data is outputted to the learning unit 424 as the learning data.

In S704, the learning unit 424 performs machine learning of the language model used to perform the task of named entity extraction by using the business form document image group as the supervised data, and evaluates the language model. Then, the processing proceeds to S705.

In S705, the learning unit 424 compares an evaluation value of the extraction result of the learned language model with a predetermined threshold. In the case where the evaluation value is higher than the threshold, the learning unit 424 outputs the learned language model and the parameters to the retaining unit 425, and the processing proceeds to step S706. In the case where the evaluation value is equal to or lower than the threshold, the processing is terminated.

In S706, the retaining unit 425 retains the learned language model and the parameters. Moreover, the management unit 422 manages the retained contents. Then, the processing proceeds to S707.

In S707, the management unit 422 monitors the contents retained in the retaining unit 425 and, in the case where a transmission condition is satisfied, the processing proceeds to S708. In the case where the transmission condition is not satisfied, the processing is terminated. The transmission condition is such a condition that the language model newly retained in the retaining unit 425 and the parameters thereof have a higher evaluation value than that of the language model and the parameters transmitted in the previous processing. However, the transmission condition is not limited to this. For example, the transmission condition may be such a condition that a certain period has elapsed from the previous transmission and the evaluation value is higher than the previous evaluation value by a predetermined threshold or more.

In S708, the transmission unit 426 transmits the predetermined language model and the parameters thereof retained in the retaining unit 425 to the reception unit 417 of the first information processing apparatus 410 via the management unit 422. The management unit 422 records the transmitted contents.

That is the processing procedure executed by the second information processing apparatus 420.

Figure 9:
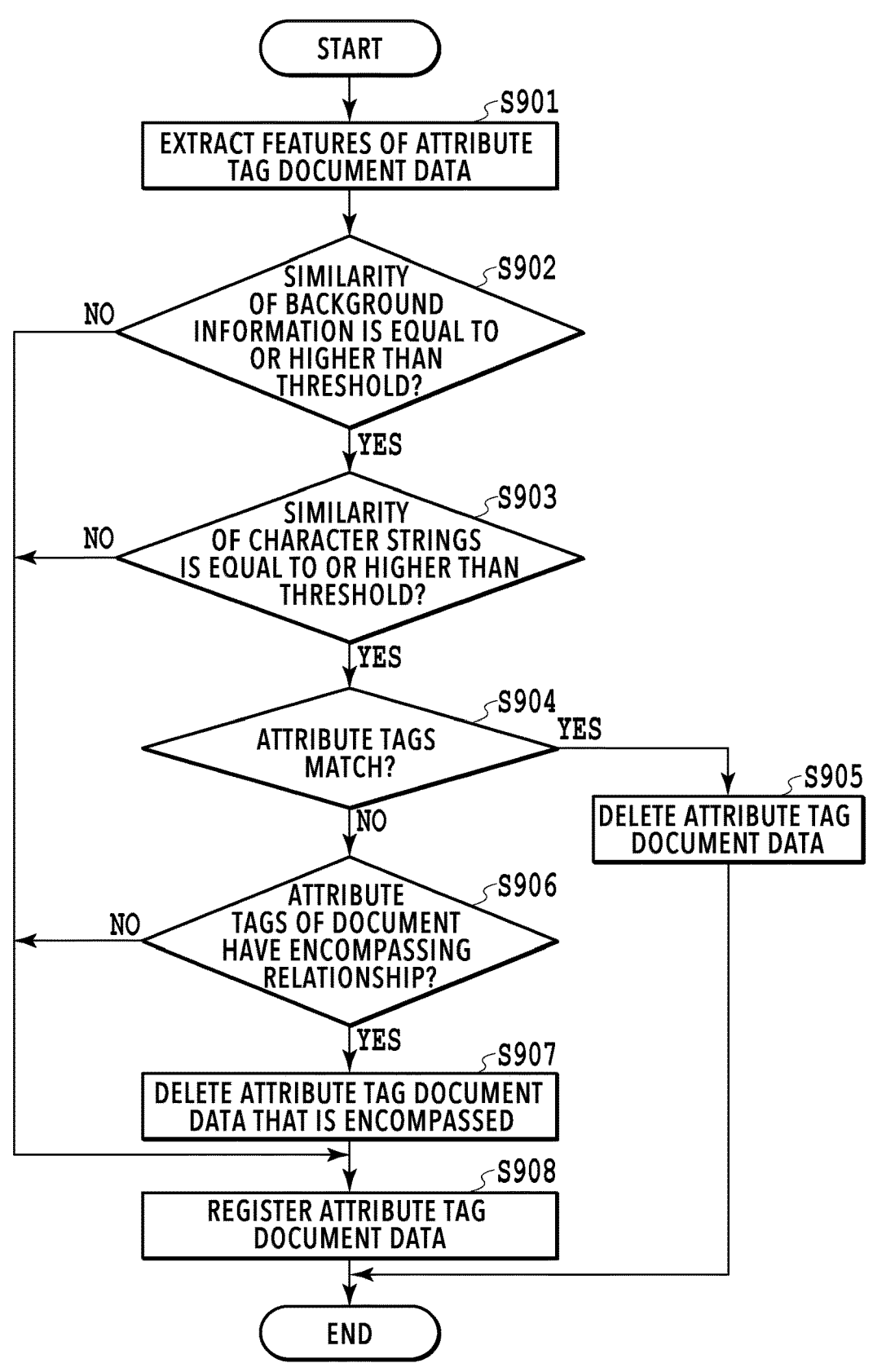
FIG. 9 is a flowchart illustrating a procedure in which the second information processing apparatus in the first embodiment registers the attribute tag document data into a database.

The details of the method in which the management unit 422 registers the attribute tag document data in the database 427 in S702 are described by using FIG. 9.

In S901, the management unit 422 extracts features of the registration candidate attribute tag document data. Specifically, the management unit 422 obtains an image feature of a background image as the background information, the character strings extracted as the character information, and the list of attribute tags.

In S902, the management unit 422 calculates a similarity between the image feature of the background information in the registration candidate attribute tag document data and the image feature of the attribute tag document data already registered in the database 427. For example, a similarity in SIFT feature amount can be used as the similarity. Note that the image feature amount and the method of calculating the similarity are not limited to these. In the case where the similarity is equal to or higher than the threshold, the processing proceeds to S903. In the case where the similarity is lower than the threshold, the processing proceeds to S908.

In S903, the management unit 422 compares the character strings in the registration candidate attribute tag document data and the character strings in the attribute tag document data already registered in the database 427 to calculate a similarity therebetween. Since the character strings include an OCR error, comparison of exact match or comparison of entire character strings is difficult. Accordingly, for each character block, the management unit 422 calculates a matching degree of a position of the character block and a similarity of a character string in the character block, and adds up the matching degrees and the similarities for multiple character blocks in the document image to obtain the similarity for each document. A Levenshtein distance between the character strings is used for the calculation of similarity. Note that a portion which is an attribute tag in at least one of the documents being compared with each other is not included in targets of the similarity calculation and the comparison is performed in character string portions other than the attribute tag. In the case where the similarity for the document is equal to or higher than the threshold, the processing proceeds to S904. In the case where the similarity for the document is lower than the threshold, the processing proceeds to S908.

In S904, the management unit 422 performs comparison to determine whether the attribute tags in the registration candidate attribute tag document data and the attribute tags in the attribute tag document data already registered in the database 427 match one another. In the case where the attribute tags corresponding to the same position in the document images of both pieces of attribute tag document data compared with each other are the same attribute tag (for example, the case where the tag of <issued date> is at the same position in both document images or in a similar situation), the management unit 422 considers that there is a match. In the case where the compared portions are both attribute tags but one attribute tag is <destination organization name> and the other is <destination personal name>, the management unit 422 considers that there is no match. Moreover, in the case where one of the compared portions is the attribute tag and the other is a character string portion that is not the attribute tag, the management unit 422 considers that there is no match. In the case where the attribute tags match one another, the processing proceeds to S905. In the case where the attribute tags do not match one another, the processing proceeds to S906.

In S905, the management unit 422 deletes the registration candidate attribute tag document data. The case where the processing reaches this step is the case where the pieces of attribute tag document data already registered in the database 427 include the attribute tag document data whose similarity of the background information and the character strings to the registration candidate attribute tag document data is equal to or higher than the threshold and that includes the attribute tags matching those in the registration candidate attribute tag document data. Since the database 427 does not have to retain multiple pieces of equivalent attribute tag document data, the registration candidate attribute tag document data is deleted in this step. After the deletion, the processing is terminated.

In S906, the management unit 422 determines whether the registration candidate attribute tag document data has an encompassing relationship for the attribute tag, with the attribute tag document data already registered in the database 427. Having the encompassing relationship for a certain attribute tag refers to the case where the attribute tag is designated in one piece of attribute tag document data while a corresponding portion is a character string in the other piece of attribute tag document data. For example, having the encompassing relationship is the case where a certain portion is <issuer organization name> in one piece of attribute tag document data and the corresponding character string in the other piece of attribute tag document data is "Canon Inc.". In such a case, the management unit 422 determines that the one piece of attribute tag document data encompasses the attribute tag document data in which "Canon Inc." is written. The case where there is no encompassing relationship for a certain attribute tag is the case where the attribute tag in one piece of attribute tag document data is different from the corresponding attribute tag in the other piece of attribute tag document data. Since the user edits the attribute tags in S604, there is sometimes a case where the named entity is intentionally left as it is or the attribute tag is added. Accordingly, such an encompassing relationship sometimes occurs.

Note that the definition of the encompassing relationship is not limited to this. For example, the configuration may be such that attribute tag estimation is performed on the character string portion assumed to be encompassed as described above by using a not-illustrated attribute estimation portion, and the attribute tag document data is considered to have the encompassing relationship only in the case where the estimated attribute tag matches the corresponding attribute tag. For example, assume a case where the attribute tag in one piece of attribute tag document data is <issuer organization name> and the corresponding character string in the other piece of attribute tag document data is "Shimomaruko Hanako". In this case, the attribute estimation unit estimates the attribute of "Shimomaruko Hanako" and, in the case where the attribute is estimated to be <issuer organization name>, the management unit 422 considers that the one piece of attribute tag document data encompasses the other piece of the attribute tag document data. Meanwhile, in the case where the attribute estimation unit estimates that the attribute of "Shimomaruko Hanako" is <issuer personal name> or the like in the attribute estimation, the management unit 422 may determine that the pieces of attribute tag document data do not have the encompassing relationship.

As described above, in the case where all attribute tags in one piece of attribute tag document data match or have the encompassing relationship with the corresponding attribute tags or character strings in the other piece of attribute tag document data, the one piece of attribute tag document data is determined to have the encompassing relationship. In the case where there is at least one attribute tag that does not match or does not have the encompassing relationship, this piece of attribute tag document data is determined not to have the encompassing relationship. In the case where the attribute tag document data having the encompassing relationship with the registration candidate attribute tag document data is already registered in the database 427, the processing proceeds to S907. In the case where there is no attribute tag document data having the encompassing relationship with the registration candidate attribute tag document data in the database 427, the processing proceeds to S908.

In S907, the management unit 422 deletes the registration candidate attribute tag document data determined to have the encompassing relationship in S906. Specifically, in the case where the attribute tag document data encompassing the registration candidate attribute tag document data is already registered in the database 427, the management unit 422 deletes the registration candidate attribute tag document data without registering it into the database 427. Moreover, in the case where the registration candidate attribute tag document data encompasses the attribute tag document data already registered in the database 427, the management unit 422 deletes the attribute tag document data registered in the database 427 and registers the registration candidate attribute tag document data into the database 427. Then, the processing proceeds to S908.

In S908, the management unit 422 registers the registration candidate attribute tag document data into the database 427. In the case where the attribute tag document data is to be registered, the character information and the image feature of the background image obtained in S901 are registered while being linked to each other. The character information saved herein is in such a form that calculation is facilitated in the calculation of the character string similarity. Note that, in the case where the registration candidate attribute tag document data is deleted in S907, there is no attribute tag document data to be registered. Accordingly, no processing is performed. The processing is then terminated.

Next, description is given of a processing procedure executed after the first information processing apparatus 410 receives the data transmitted from the second information processing apparatus 420, by using FIG. 8.

In S801, the reception unit 417 receives the language model of the extraction unit 412 and the parameters of the weight and threshold of this language model from the second information processing apparatus 420. The reception unit 417 outputs the received language model and parameters to the updating unit 418.

In S802, the updating unit 418 determines whether a condition for updating the language model and the parameters of the extraction unit 412 is satisfied or not. In the case where the updating unit 418 determines that the update condition is satisfied, the processing proceeds to S803. In the case where the update condition is not satisfied, the processing is terminated. In the case where the update condition is not satisfied, the processing may return to S802 again after waiting of a predetermined period. The update condition is, for example, such a condition that a predetermined time period has elapsed from the previous update, the evaluation value of the language model and parameters to be updated exceeds a predetermined evaluation value, and the extraction unit 412 is currently in an updatable state. Note that the update condition is not limited to this condition.

In S803, the updating unit 418 updates the language model and the parameters of the extraction unit 412.

That is the processing procedure executed by the first information processing apparatus 410.

As described above, in the present embodiment, even for the business form document including the confidential information, it is possible to generate the business form document image to be the disclosable learning data by performing the named entity extraction on the scanned image of the business form document and generating the attribute tag document data. The generated business form document image includes no confidential information and can be thus used to perform machine learning of natural language processing relating to the business form document in an external server. The machine learning using the generated business form document image includes machine learning relating to various tasks of comprehending and utilizing business form documents, and can also perform the learning of the language model of the extraction unit 412 used to perform the named entity extraction in the present embodiment.

Second Embodiment

In the case where the attribute tag document data is to be generated by using scanned images of confidential documents such as business form documents as input, an information processing apparatus according to a second embodiment performs high-security document management while saving memory. In the first embodiment, the attribute tag document data and the extraction result of the named entities generated from the inputted document image are registered in the same database 419. However, in the present embodiment, the attribute tag document data and the extraction result of the named entities including the confidential information are registered and managed in separate databases. Moreover, in the case where the named entities vary but pieces of the attribute tag document data are substantially the same, the attribute tag document data is made shareable to reduce the pieces of retained attribute tag document data.

Figure 10:
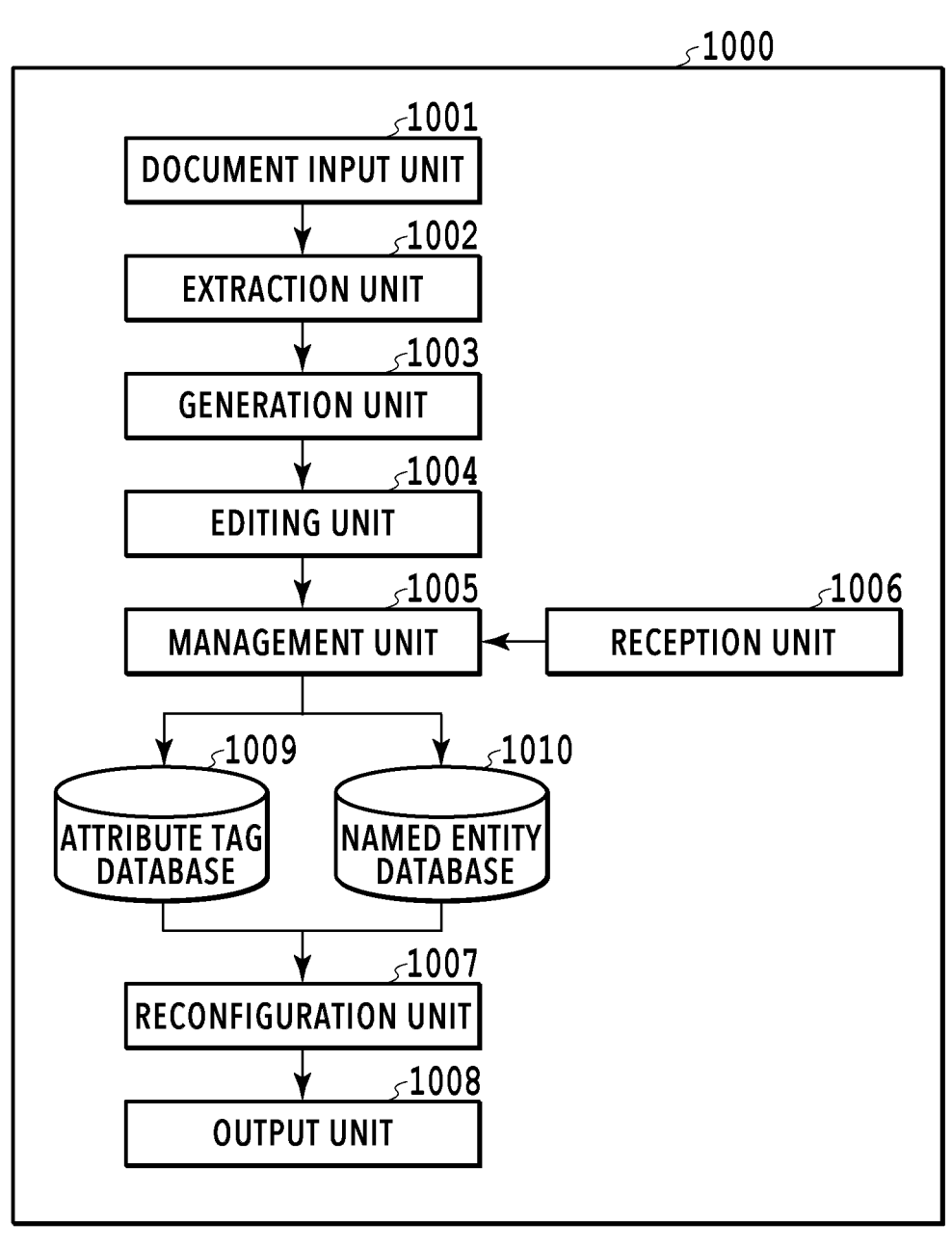
FIG. 10 is a diagram illustrating a functional configuration example of an information processing apparatus in a second embodiment.

FIG. 10 is a diagram illustrating a functional configuration example of an information processing apparatus 1000 in the present embodiment. The information processing apparatus 1000 includes a document input unit 1001, an extraction unit 1002, a generation unit 1003, an editing unit 1004, a management unit 1005, a reception unit 1006, a reconfiguration unit 1007, an output unit 1008, an attribute tag database 1009, and a named entity database 1010. The information processing apparatus 1000 is connected to a scanner and an output apparatus. Note that the configuration illustrated in FIG. 10 is an example of the functional configuration in the present embodiment and the functional configuration is not limited to this.

The information processing apparatus 1000 in the present embodiment has a configuration close to that of the first information processing apparatus 410 illustrated in FIG. 4 of the first embodiment. Since the document input unit 1001, the extraction unit 1002, the generation unit 1003, and the editing unit 1004 have the same functions as the document input unit 411, the extraction unit 412, the generation unit 413, and the editing unit 414, respectively, description thereof is omitted in this section. Description is given below of the management unit 1005, the reception unit 1006, the reconfiguration unit 1007, the output unit 1008, the attribute tag database 1009, and the named entity database 1010 that are configurations different from those in the first embodiment.

The management unit 1005 receives the attribute tag document data generated in the generation unit 1003 and the extraction result of the named entities extracted in the extraction unit 1002 as input and registers and retains the attribute tag document data and the extraction result in the attribute tag database 1009 and the named entity database 1010, respectively. The management unit 1005 manages an identifier (file name, ID, or the like) indicating an original business form document image, an ID of the attribute tag document data, and an ID of a named entity set of the extraction result of the named entities associating with one another such that the original business form document image can be reconfigured. Moreover, the management unit 1005 manages each named entity by linking it with information indicating which attribute tag in the attribute tag document data the block ID, the start position, the end position, and the attribute corresponds to. Note that items to be managed are not limited to these items.

The attribute tag database 1009 saves the attribute tag document data together with the ID of the attribute tag document data appended in the management unit 1005.

The named entity database 1010 saves the named entities as the named entity set for each piece of attribute tag document data, together with the ID of the named entity set.

Although the named entity database 1010 is a component element in the information processing apparatus 1000 in the present embodiment, the configuration is not limited to this. For example, since the named entities are confidential information, the named entities may be saved in a high-security database outside the information processing apparatus 1000 or saved while being encrypted. Moreover, access to the named entities may be managed by using access authority or a password. Furthermore, the attribute tag database 1009 and the named entity database 1010 may be established in separate storage devices or established separately in the same storage device by using access control.

The reception unit 1006 receives a query of requesting output of a business form document image from a user and outputs the received query to the management unit 1005. The query includes an identifier indicating the original business form document image and information designating an expression method of each attribute tag portion. The expression of the attribute tag portions includes, for example, an image illustrating the attribute tag, an image illustrating an original character string, an image illustrating a character string that has the same attribute as the original character string but is different from the original character string, an image filled with a single color (blacked out), and the like, but may be any other image.

The reconfiguration unit 1007 reconfigures the business form document image according to the business form document image output query inputted from the reception unit 1006. The reconfiguration unit 1007 obtains the attribute tag document data and the named entity set necessary for the reconfiguration of the business form document image from the attribute tag database 1009 and the named entity database 1010, respectively, via the management unit 1005. The reconfigured business form document image is outputted to the output unit 1008.

The output unit 1008 outputs the business form document image reconfigured in the reconfiguration unit 1007, to the external output apparatus such as a display or a printer.

Figure 11:
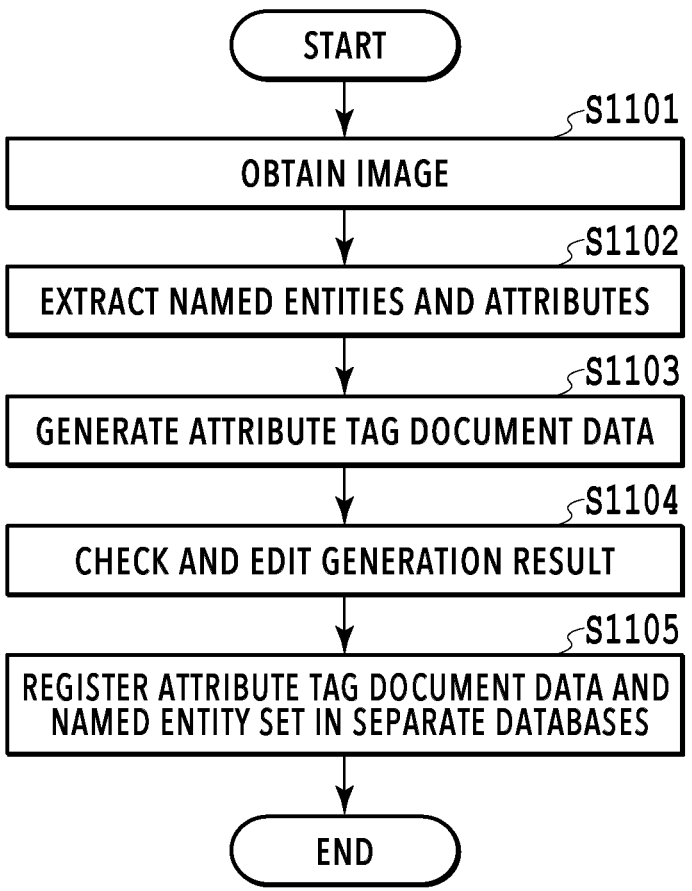
FIG. 11 is a flowchart illustrating a processing procedure executed by the information processing apparatus in the second embodiment.
Figure 12:
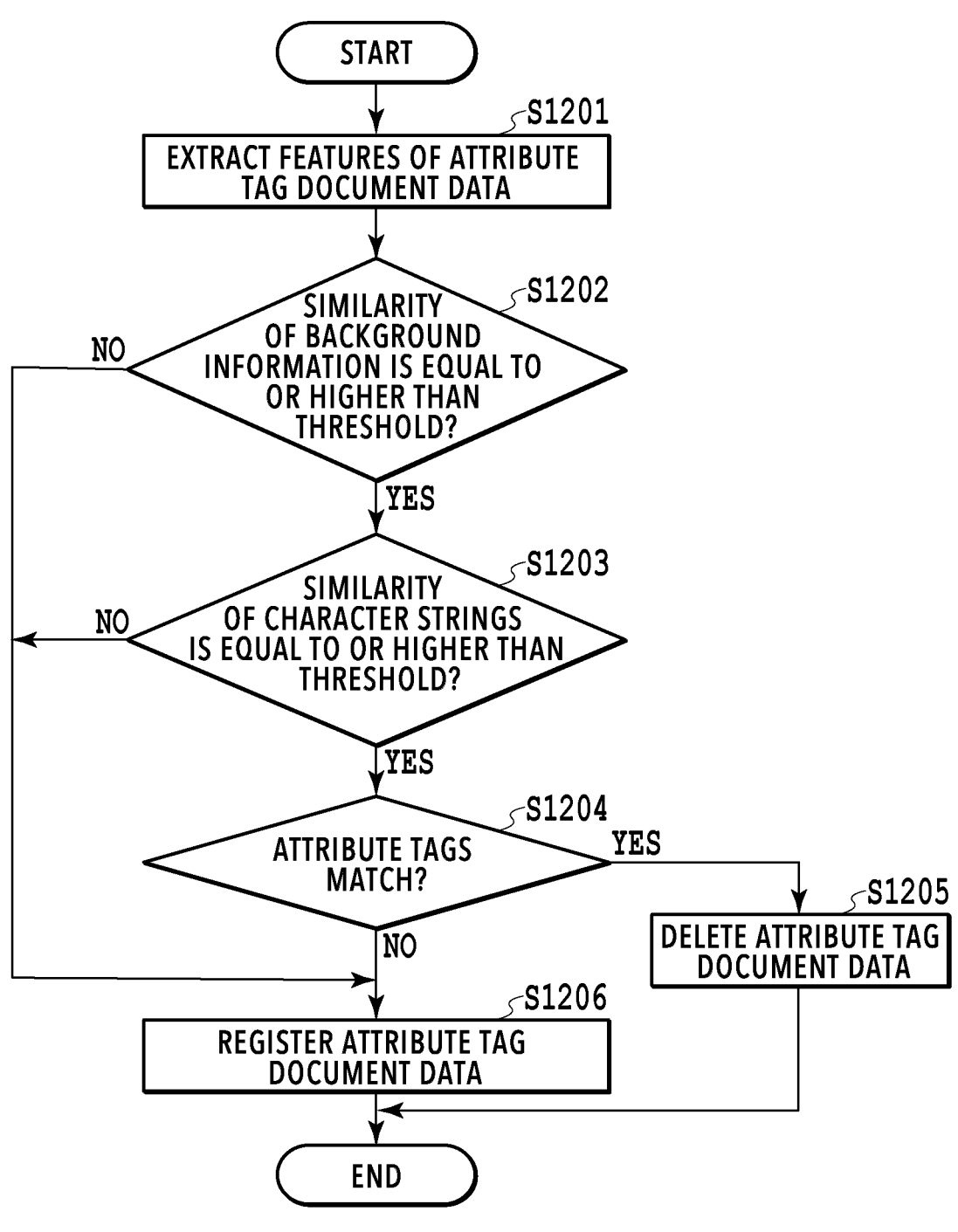
FIG. 12 is a flowchart illustrating a procedure in which the information processing apparatus in the second embodiment registers the attribute tag document data into a database.
Figure 13:
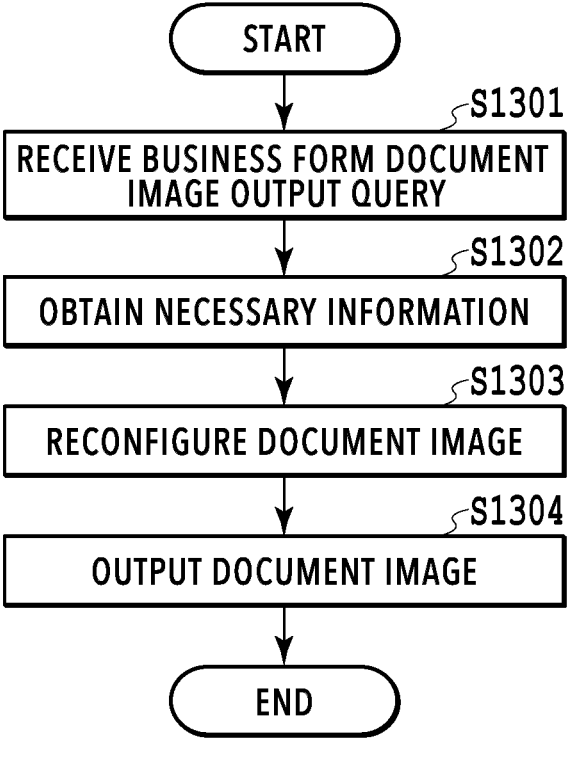
FIG. 13 is a flowchart illustrating a processing procedure executed by the information processing apparatus in the second embodiment.

Next, a processing procedure in the present embodiment is described. FIG. 11 is a flowchart illustrating the processing procedure executed from a point where the information processing apparatus 1000 receives the business form document image to a point where the information processing apparatus 1000 registers data in the databases. FIG. 12 is a flowchart illustrating a procedure in which the information processing apparatus 1000 registers the attribute tag document data in the attribute tag database 1009. FIG. 13 is a flowchart illustrating a processing procedure executed from a point where the information processing apparatus 1000 receives a business form document image output query to a point where the information processing apparatus 1000 outputs the business form document image.

First, the processing procedure executed from the point where the information processing apparatus 1000 receives the document to the point where the information processing apparatus 1000 registers the data in the databases is described by using FIG. 11. Note that, since S1101 to S1104 are the same as S601 to S604 of the first embodiment illustrated in FIG. 6, description thereof is omitted and description is given of S1105 that is different.

In S1105, the management unit 1005 links the attribute tag document data generated in S1103 and the extraction result extracted in S1102 to each other by using an ID, and registers the attribute tag document data and the named entity set into the attribute tag database 1009 and the named entity database 1010, respectively. The registration into the attribute tag database 1009 by the management unit 1005 is described in detail later.

Next, the procedure in which the information processing apparatus 1000 registers the attribute tag document data into the attribute tag database 1009 is described by using FIG. 12. Note that, since S1201 to S1204 are the same as S901 to S904 of the first embodiment illustrated in FIG. 9, description thereof is omitted and description is given of S1205 and S1206 that are different.

In S1205, the information processing apparatus 1000 deletes the registration candidate attribute tag document data and links the extraction result of the named entities extracted in S1102 with the attribute tag document data corresponding to the registration candidate attribute tag document data and already registered in the attribute tag database 1009.

In S1206, the management unit 1005 registers the registration candidate attribute tag document data into the attribute tag database 1009. In the registration of the attribute tag document data, the management unit 1005 registers the character information and the image feature of the background image extracted in S1201 and the extraction result of the named entities extracted in S1102 associating with one another. The character information saved herein is in such a form that calculation is facilitated in the calculation of the character string similarity. The processing is then terminated.

This processing can cause the information processing apparatus 1000 to register only one piece of attribute tag document data in the attribute tag database 1009 and register only the named entities that are differences in the named entity database 1010, for documents for which the same attribute tag document data is generated. Accordingly, it is possible to retain data while saving memory.

Next, the processing procedure executed from the point where the information processing apparatus 1000 receives the query to the point where the information processing apparatus 1000 outputs the reconfigured business form document image is described by using FIG. 13.

In S1301, the reception unit 1006 receives the business form document image output query of requesting output of the business form document image. The received query is outputted to the management unit 1005.

In S1302, the management unit 1005 obtains necessary information according to query information. First, the management unit 1005 obtains the attribute tag document data linked to the identifier indicating the document from the attribute tag database 1009, based on this identifier. Then, in the case where the named entities are necessary, the management unit 1005 obtains the named entities from the named entity database 1010 based on the expression method of the attribute tag portion. In the case where the black-out or the random character string is designated as the expression method of the attribute tag portion, the named entities are unnecessary. The management unit 1005 outputs the obtained information to the reconfiguration unit 1007.

In S1303, the reconfiguration unit 1007 reconfigures the business form document image based on information obtained from the attribute tag database 1009 and the named entity database 1010. Specifically, the reconfiguration unit 1007 replaces the attribute tag portions in the attribute tag document data based on the query. For example, in the case where the attribute tag portions are to be replaced by the character strings of the original business form document, the reconfiguration unit 1007 finds the character string of the named entity corresponding to each attribute tag from the obtained named entities, and replaces the attribute tag with the character string of the corresponding named entity. In the case where the attribute tag portions are to be replaced by black-out, the reconfiguration unit 1007 replaces the attribute tag portions with blacked-out blocks. In the case where each attribute tag portion is to be replaced by a named entity randomly selected from the named entities of the same attribute, the reconfiguration unit 1007 obtains a character string of a named entity corresponding to the same attribute from a not-illustrated database of named entities, and replaces the attribute tag with the obtained character string. The business form document image based on query is thus reconfigured from the attribute tag document data. The reconfigured business form document image is outputted to the output unit 1008.

In S1304, the output unit 1008 outputs the reconfigured business form document image to the output apparatus. The processing is then terminated.

That is the processing procedure executed by the information processing apparatus 1000.

In the aforementioned configuration, documents can be managed while the business form document images taken in by the document input unit 1001 from the scanner are each divided into the attribute tag document data and the named entities. In the case where the attribute tag document data are common to documents, only one piece of attribute tag document data and multiple named entities that are differences need to be registered. Accordingly, it is possible to manage data while saving memory. Moreover, since the named entities are registered in the named entity database 1010 separately from the attribute tag document data, the named entities can be managed under high security. Furthermore, it is possible to receive the business form document image output query from the user and reconfigure the document according to the query information.

Other Embodiments

Although the form in which the first information processing apparatus 410 is connected to one scanner is described in the first embodiment, the configuration is not limited to this. The configuration may be such that the first information processing apparatus 410 is connected to multiple scanners via a network and each scanner outputs scanned information to the document input unit 411. Alternatively, the configuration may be such that, in the case where the scanners and the first information processing apparatuses 410 are connected in a one-to-one fashion and there are multiple sets of scanners and information processing apparatuses 410, these multiple sets are connected to one second information processing apparatus 420. In such a configuration, it is possible to concentrate calculation resources for learning while offering a service of generating the attribute tag document data over a wide range.

Although the example in which both of the background information and the character information are generated as the information included in the attribute tag document data is described in the first embodiment, the attribute tag document data is not limited to this. For example, the attribute tag document data may include only the attribute information and the character strings other than the named entities. In the case where there are only the character strings other than the named entities, the original document image cannot be reconfigured. However, in the case where the task of learning requires only the character strings as input, the attribute tag document data can be sufficiently used as the learning data. This configuration can reduce processing load from that in the case where the attribute tag document data includes the document image, and can also suppress a memory usage in the database and the retaining unit.

In the first embodiment, description is given of the method in which the generation unit 413 obtains the character strings to replace the attribute tags of the attribute tag document data, from the not-illustrated database. The configuration may be such that this database includes a character string list for each attribute tag, and a not-illustrated editing unit edits the character string list. This can increase variations of generatable business form documents, and can achieve more effective learning of business form documents.

In the first embodiment, in the case where each attribute tag is to be replaced by the character string, the generation unit 413 performs line feed or font size change such that the character string fits into the superimposable range. However, the method of replacement with the character string is not limited to this. For example, the configuration may be such that the order of reading is set for the character string blocks and the superimposable ranges in the document image, and a portion of the character string that does not fit in a certain superimposable range is added to a head portion of the next character string block or superimposable range in the order of reading. Moreover, in the case where a portion of the character string does not fit into the character string block or the super imposable range again due to this addition, this process may be repeated until the character string fits. This maintains uniformness of the character size in the document, and can reduce excessive line feed in the character string block or the superimposable range. The format of the reconfigured document image can be thereby improved.

Although the example in which the result of learning in the second information processing apparatus 420 is transmitted to the first information processing apparatus 410 is described in the first embodiment, the configuration is not limited to this. For example, the form may be such that the second information processing apparatus 420 pays a reward to the first information processing apparatus 410, as a compensation to transmission of the attribute tag document data. An amount of money such as $0.1 per one piece of attribute tag document data may be set as a reward, or a point in a point service may be given as a reward. In the case where a subscription service for scanner usage is offered, monthly subscription fee may be discounted if the user transmits the attribute tag document data. In this case, the user scanning the document also has a benefit of transmitting the attribute tag document data, and the attribute tag document data can be collected more easily.

Although the example in which the editing unit 414 corrects the named entities and the attribute tags is described in this first embodiment, the configuration is not limited to this. For example, the editing unit 414 may rearrange the order of the character blocks or delete and add phonetic character blocks. The editing unit 414 may also interchange portions of a character string in each character block, delete a portion of the character string, replace a portion of the character string with a synonym, or insert a synonym. The editing unit 414 may also change the position and size of the superimposable range or change the background information. Since the editing unit 414 can generate different attribute tag document data by adding such changes, it is possible to increase variations of the attribute tag document data and improve robustness of the task to be learned.

Although the example in which the attribute tags editable by the editing unit 414 are set by being selected from the attribute list preset in the extraction unit 412 is described in the first embodiment, the configuration is not limited to this. The user may newly create an attribute tag and add the newly created tag by using the editing unit 414. Note that, in the case where the new attribute tag is added, character strings to be replaced by the new attribute tag are also set. The management unit 415 manages information on specific examples of the character strings corresponding to the new attribute tag in the database 419 associating with the new attribute tag. Moreover, this information is also transmitted to the second information processing apparatus 420 together with the attribute tag document data in the case where the transmission unit 416 transmits the attribute tag document data to the second information processing apparatus 420. The generation unit 423 obtains the character strings corresponding to the new attribute tag from a not-illustrated database. In the case where there is no corresponding character string in the database, the generation unit 423 may notify the sever manager of this absence, and make the server manger add corresponding information to the database. Then, the second information processing apparatus 420 may generate the learning data by using various character strings corresponding to the new attribute tag, and perform the learning. This allows the named entity extraction to be newly performed also for the attribute tag newly added by the user.

Although the extraction unit 412 is described to extract all predetermined attributes in the first embodiment, the configuration is not limited to this. For example, the configuration may be as follows. The user selects types of attribute tags to be extracted by using a not-illustrated adaptation unit, the adaptation unit outputs the selected attribute information to the extraction unit 412, and the extraction unit 412 extracts only the named entities of the attributes included in the inputted attribute information. Alternatively, the configuration may be such that the named entities are extracted for all attributes but, in the case where the user corrects or adds an attribute in the editing unit 414, only the extraction result of the named entities for the attribute tag selected by the user is displayed on a not-illustrated display unit to allow correction and addition. Moreover, the management unit 415 may replace the named entities of the not-selected attributes to the attribute tags and then register the named entities in the database 419. Specifically, the management unit 415 may present the named entities to the user by replacing only the named entities of the selected attributes whose extraction is considered to be necessary by the user with the attribute tags and by leaving the named entities of the other attributes as the character strings without change, while replacing all named entities with the attribute tags in the attribute tag document data. This can increase the variations of the business form document images that can be generated in the generation unit 423.

Although the extraction unit 1002 is described to extract the named entities of all predetermined attributes in the second embodiment, the configuration is not limited to this. For example, the configuration may be such that the user selects the named entities of the attributes to be extracted by using a not-illustrated adaptation unit and then the adaptation unit outputs the selected attribute information to the extraction unit 1002. The extraction unit 1002 may extract only the named entities of the attributes included in the inputted attribute information. Then, the management unit 1005 registers the attribute tag document data in which only the named entities of the selected attributes are replaced by the attribute tags, in the attribute tag database 1009, and registers the named entities replaced by the attribute tags in the named entity database 1010. This enables such management that only the named entities whose extraction is considered to be necessary by the user are replaced by the attribute tags and some of the named entities are left as the character strings.

Although the case where the identifier of the original document is described in the query inputted into the reception unit 1006 is described in the second embodiment, the configuration is not limited to this. For example, the configuration may be such that only the ID of the attribute tag document data is described, and the business form image is reconfigured without using the named entities by blacking-out the attribute tags or by randomly selecting character strings corresponding to the named entities of the same attributes as the attribute tags and replacing the attribute tags with the selected character strings. This allows also a user who cannot access the named entities to obtain the business form document image reconfigured based on the attribute tag document data.

Although the example in which the attribute tag document data is retained, managed, and reconfigured is described in the second embodiment, searching in the attribute tag document data may be made possible. A not-illustrated search query reception unit obtains input of search word, and outputs the obtained search word to the management unit 1005. The management unit 1005 searches for the attribute tag document data corresponding to the search word. The desired attribute tag document data can be thereby searched for. Moreover, the management unit 1005 may perform user authentication and, in the case where the user is a user who can access the named entity database 1010, allow the user to search for a search word in the named entity database. Further, the configuration may be such that the management unit 1005 obtains the named entity obtained as a result of the searching and the attribute tag document data linked to the obtained named entity, and the reconfiguration unit 1007 reconfigures and outputs the original document image. Note that an access right may be individually set not only for each user but also for, for example, each document or each named entity. This enables document management and searching with high degree of access right setting freedom.

Note that, in the second embodiment, the configuration may be such that learning of a language model using the attribute tag document data generated in the information processing apparatus 1000 is performed in another information processing apparatus and the language model of the extraction unit 1002 is updated based on the result of this learning as in the first embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can generate a disclosable document image based on a document image including confidential information, without using the confidential information.

This application claims the benefit of Japanese Patent Application No. 2021-202343, filed Dec. 14, 2021, which is hereby incorporated by reference wherein in its entirety.

What is claimed is:

1. An information processing apparatus comprising:
a controller including a processor and a memory, the controller configured to:
acquire a first document image obtained by scanning a document;
extract character blocks from the first document image;
perform optical character recognition processing on respective extracted character blocks to obtain character strings;
extract a character string corresponding to a named entity of a predetermined attribute from the obtained character strings; and
generate document data including at least attribute information relating to the attribute of the named entity corresponding to the extracted character string and position information of the character block corresponding to the extracted character string, wherein the document data includes a second document image in which the character block corresponding to the extracted character string in the first document image is replaced by an image indicating the attribute information based on the position information.

2. The information processing apparatus according to claim 1, wherein the controller is further configured to: generate a third document image in which the image indicating the attribute information in the second document image is replaced by an arbitrary image.

3. The information processing apparatus according to claim 2, wherein the arbitrary image is an image expressing a character string that has the same attribute as the named entity of the extracted character string and that is different from the extracted character string.

4. The information processing apparatus according to claim 2, wherein the arbitrary image is an image filled with a predetermined color.

5. The information processing apparatus according to claim 2, wherein the arbitrary image is superimposed on a region that includes a region in which the image indicating the attribute information to be replaced by the arbitrary image is superimposed and that does not overlap other objects in the second document image.

6. The information processing apparatus according to claim 1, wherein the controller is further configured to: individually save the document data and the extracted character string associating with each other.

7. The information processing apparatus according to claim 6, wherein, in the case where similar document data whose similarity to document data to be newly saved is equal to or more than a predetermined threshold and whose attribute information matches that of the document data to be newly saved is saved, only one of the document data to be newly saved and the similar document data is saved.

8. The information processing apparatus according to claim 6, wherein the controller is further configured to: reconfigure the first document image based on the document data and the extracted character string associated with the document data.

9. The information processing apparatus according to claim 1, wherein the controller is further configured to:

cause a display device to display the first document image, the attribute information, and the extracted character string; and receive user input and edit the attribute information and the extracted character string based on the user input.

10. An information processing method comprising:

acquiring a first document image obtained by scanning a document;

extracting character blocks from the first document image;

performing optical character recognition processing on respective extracted character blocks to obtain character strings;

extracting a character string corresponding to a named entity of a predetermined attribute from the obtained character strings; and generating document data including at least attribute information relating to the attribute of the named entity corresponding to the extracted character string and position information of the character block corresponding to the extracted character string, wherein the document data includes a second document image in which the character block corresponding to the extracted character string in the first document image is replaced by an image indicating the attribute information based on the position information.

* * * * *